Patented Dec. 7, 1926.

1,609,520

UNITED STATES PATENT OFFICE.

EDOUARD LAYRAUD, OF PARIS, FRANCE, ASSIGNOR TO ETABLISSEMENTS POULENC FRERES, OF PARIS, FRANCE.

PREPARATION OF C-C-NORMAL BUTYL ETHYL BARBITURIC ACID.

No Drawing. Original application filed February 3, 1922, Serial No. 533,976, and in France February 4, 1921. Divided and this application filed December 1, 1923. Serial No. 678,054.

This is a division of my patent application Serial No. 533,976, filed February 3, 1922.

My invention relates to the synthesis of a new dissymmetric dialkyl derivative of barbituric acid, namely, butyl-ethyl-barbituric acid or butyl ethyl malonyl urea, a compound possessing the general formula

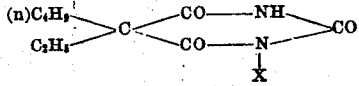

where X represents hydrogen or a metallic element.

This compound exhibits very pronounced hypnotic and sedative properties and yet possesses a very low toxicity.

The new compound may be readily prepared by various processes, one being the treating of butyl-ethyl-malonic ester with urea and preferably sodium to form the sodium salt of butyl-ethyl-barbituric acid, the free acid being subsequently liberated by the addition of hydrochloric acid, and purified by recrystallization.

I choose to prepare this new compound in the following manner:—

20 parts by weight of sodium are dissolved in 1000 parts of absolute alcohol, 50 parts of dried urea are then added and the mixture is heated until the urea is dissolved. 130 parts of normal butyl-ethyl-malonic ester are now slowly introduced, and the mixture is heated in an enameled autoclave for several hours at a temperature of 100–110° C. After the excess of alcohol has been distilled from the reaction mixture, water is added, and the normal butyl-ethyl-barbituric acid is precipitated by hydrochloric acid. The product is filtered off and recrystallized from hot water in which it is readily soluble. On cooling, the normal butyl-ethyl barbituric acid having the formula:

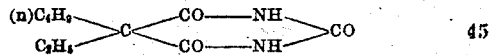

separates in the form of white needles melting at 127° C. (corrected). This compound forms soluble salts with the alkali metals, and also combines with organic bases to form crystallized soluble salts.

Having now particularly described and set forth the nature of my said invention, and in what manner the same is to be performed, I declare that what I claim is:—

1. A hypnotic compound having the formula:—

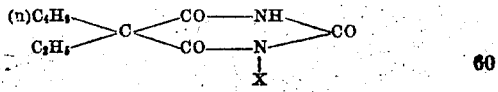

where X represents hydrogen or a metallic element.

2. The new hypnotic compound, n-butyl-ethyl barbituric acid, which has the structure

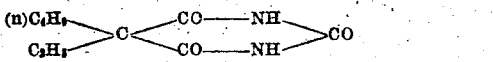

and which is an acid crystallizing from alcohol or water in white needles having a melting point of 126–127° C., and being only slightly soluble in water, readily soluble in many organic solvents; and having a very strong hypnotic activity, but low toxicity.

EDOUARD LAYRAUD.